US008508170B2

(12) United States Patent
Bochen

(10) Patent No.: US 8,508,170 B2
(45) Date of Patent: Aug. 13, 2013

(54) DRIVE DEVICE

(75) Inventor: Marian Bochen, Eitelborn (DE)

(73) Assignee: Stabilus GmbH, Koblenz (DE)

( * ) Notice: Subject to any disclaimer, the term of this patent is extended or adjusted under 35 U.S.C. 154(b) by 432 days.

(21) Appl. No.: 12/874,672

(22) Filed: Sep. 2, 2010

(65) Prior Publication Data

US 2011/0068721 A1 Mar. 24, 2011

(30) Foreign Application Priority Data

Sep. 23, 2009 (DE) ........................ 10 2009 042 456

(51) Int. Cl.
*H02P 3/22* (2006.01)

(52) U.S. Cl.
USPC ........... 318/515; 318/516; 318/362; 318/375; 318/269; 318/273; 318/266; 318/466; 74/424; 74/425

(58) Field of Classification Search
USPC ................. 318/266, 280, 466, 362, 370, 374, 318/375, 376, 515, 516, 519, 371, 372, 269, 318/272, 273, 467; 74/424, 425; 388/800
See application file for complete search history.

(56) References Cited

U.S. PATENT DOCUMENTS 3,997,827 A * 12/1976 Pajak et al. .................. 318/761
6,064,165 A * 5/2000 Boisvert et al. ............... 318/465
6,078,157 A 6/2000 Seiler et al.
6,936,983 B2 * 8/2005 Kachouh et al. .............. 318/272
7,634,951 B2 * 12/2009 Frieb-Preis et al. ......... 74/89.38
7,900,530 B2 * 3/2011 Bochen et al. ............... 74/89.23
2006/0108959 A1 * 5/2006 Gueler et al. ................. 318/445
2007/0179006 A1 * 8/2007 Kachouh ....................... 475/154
2007/0296243 A1 * 12/2007 Borrmann et al. ......... 296/146.4
2008/0060273 A1 * 3/2008 Bochen et al. .................. 49/340
2008/0216409 A1 * 9/2008 Bochen et al. .................. 49/340

FOREIGN PATENT DOCUMENTS

| | | |
|---|---|---|
| DE | 20 2005 003 466 | 8/2006 |
| DE | 10 2007 054 448 | 3/2009 |
| JP | 49-88038 | 8/1974 |
| JP | 50-8021 | 1/1975 |
| JP | 60-207475 | 10/1985 |
| JP | 11-501799 | 2/1999 |

OTHER PUBLICATIONS

English Translation of an Office Action issued on Jul. 10, 2012 in the corresponding Japanese Patent Application No. 2010-183201.

* cited by examiner

*Primary Examiner* — Antony M Paul
(74) *Attorney, Agent, or Firm* — Cozen O'Connor

(57) ABSTRACT

A driving device for a hatch in a vehicle, with a housing tube connected to a base part or to a movable structural component part, a protective tube connected to the movable structural component part or to the base part, a spindle drive having a threaded spindle and a spindle nut arranged on the threaded spindle by which the housing tube and the protective tube are movable axially relative to one another. A rotary drive drives the spindle drive in rotation includes at least one electric motor. The driving device has a safety circuit that causes a braking effect on the rotary drive when the rotary drive is deactivated and when extraneous forces are introduced into the driving device from the outside.

14 Claims, 6 Drawing Sheets

DRIVE DEVICE

BACKGROUND OF THE INVENTION

1. Field of the Invention

The invention is directed to a driving device, particularly for a hatch in a vehicle, with a housing tube that can be connected to a base part or to a movable structural component part, a protective tube, which can be connected to the movable structural component part or to the base part, a spindle drive, which has a threaded spindle, a spindle nut arranged on the threaded spindle by which the housing tube and the protective tube are movable axially relative to one another, and a rotary drive that drives the spindle drive in rotation that comprises at least one electric motor.

2. Description of the Related Art

There are many known variations of driving devices of the type mentioned above. However, these drives have the disadvantage that they are loaded by high forces in manual operation or when actuated manually in automatic operation. In a given instance, the extraneously introduced forces can exceed the usual application-based forces in the drive system many times over so that various structural component parts in the driving devices can be damaged.

SUMMARY OF THE INVENTION

It is an object of the invention to provide a driving device of the type mentioned above which has a simple and, therefore, inexpensive construction that protects the individual components of the driving device from load peaks and possible damage resulting from this.

According to one embodiment of the invention, the driving device comprises a safety circuit that causes a braking effect on the rotary drive when the rotary drive is deactivated and when extraneous forces are introduced into the driving device from the outside.

To save installation space in the driving device and facilitate assembly, the safety circuit is arranged on an electronics board located in the housing tube and associated with an arrangement for sensing speed and rotational direction, while the safety circuit works independently from the arrangement for sensing speed and rotational direction and its electric signals.

Alternatively, the safety circuit can be arranged in a cable or in a plug of the cable of the driving device.

The safety circuit comprises at least one triac by which the winding of the electric motor can be continuously short-circuited to prevent annoying jolting that has a disadvantageous influence on the installed structural component parts, since a triac does not break the circuit until the load current or the short-circuit current generated by the electric motor is at zero.

According to one embodiment of the invention, the electric motor is connected to a first connection contact of a control device and to a second connection contact of a control device. Two triacs are connected in parallel with the motor, an anode of the two triacs is connected to the first connection contact of the control device, and the other anode is connected to the second connection contact of the control device.

In an advantageous manner, the gate of one triac is connected to the first connection contact of the control device by a high-value resistor and a diode or, when using a triac type having a different internal construction, is connected to the second connection of the control device, the cathode of the diode is connected to the same connection contact, and the anode is connected to the resistor. The gate of the other triac is electrically connected to the second connection contact of the control device by another high-value resistor and a diode or, when using a non-standard triac, is electrically connected to the first connection contact of the control device, and the cathode of the diode is electrically connected to the same connection contact and the anode is electrically connected to the resistor. Alternatively, the gate of one triac is connected to one of the connection contacts of the control device via a first Zener diode, and the gate of the other triac is connected to the other connection contact via another Zener diode.

According to one embodiment of the invention, the cathode of the Zener diode, depending upon the triac type, is connected to one of the connection contacts and the cathode of the other Zener diode is connected to the other connection contact.

In another safety circuit according to one embodiment of the invention, a bridge circuit comprising four diodes, a Zener diode or a resistor, and a triac is connected in parallel with the electric motor.

According to one embodiment of the invention, two diodes are arranged in a first arm of the bridge circuit, and the cathode of one diode is connected to the first connection contact of the control device, and the cathode of the other diode is connected to the second connection contact of the control device, and the anodes of the diodes are connected to one another in an electrically conducting manner. In a second arm of the bridge circuit, two other diodes are arranged, and the anode of one diode is connected to the first connection contact of the control device, and the anode of the other diode is connected to the second connection contact of the control device, and the cathodes of the diodes are connected to one another in an electrically conducting manner.

In one embodiment, an anode of the triac is connected to the anodes of the diodes in the first arm of the bridge circuit, and the other anode is connected to the cathodes of the diodes in the second arm of the bridge circuit.

Further, the triac, together with the Zener diode connected to the gate of the triac, forms a bridge branch, and the anode of the Zener diode is connected to the gate of the triac, and the cathode is connected to the cathodes of the diodes in the second arm or, in case of a triac with a different internal construction, is connected to the anodes of the diodes in the first arm.

Alternatively, the triac, together with the resistor connected to the gate of the triac, forms a bridge branch, and a contact of the resistor is connected to the gate of the triac, and the other contact is connected to the cathodes of the diodes in the second arm or, in case of a triac with a different internal construction, is connected to the anodes of the diodes in the first arm.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment examples of the invention are shown in the drawing and are described more fully in the following. In the drawings.

DETAILED DESCRIPTION OF THE PRESENTLY PREFERRED EMBODIMENTS

Figure 1:
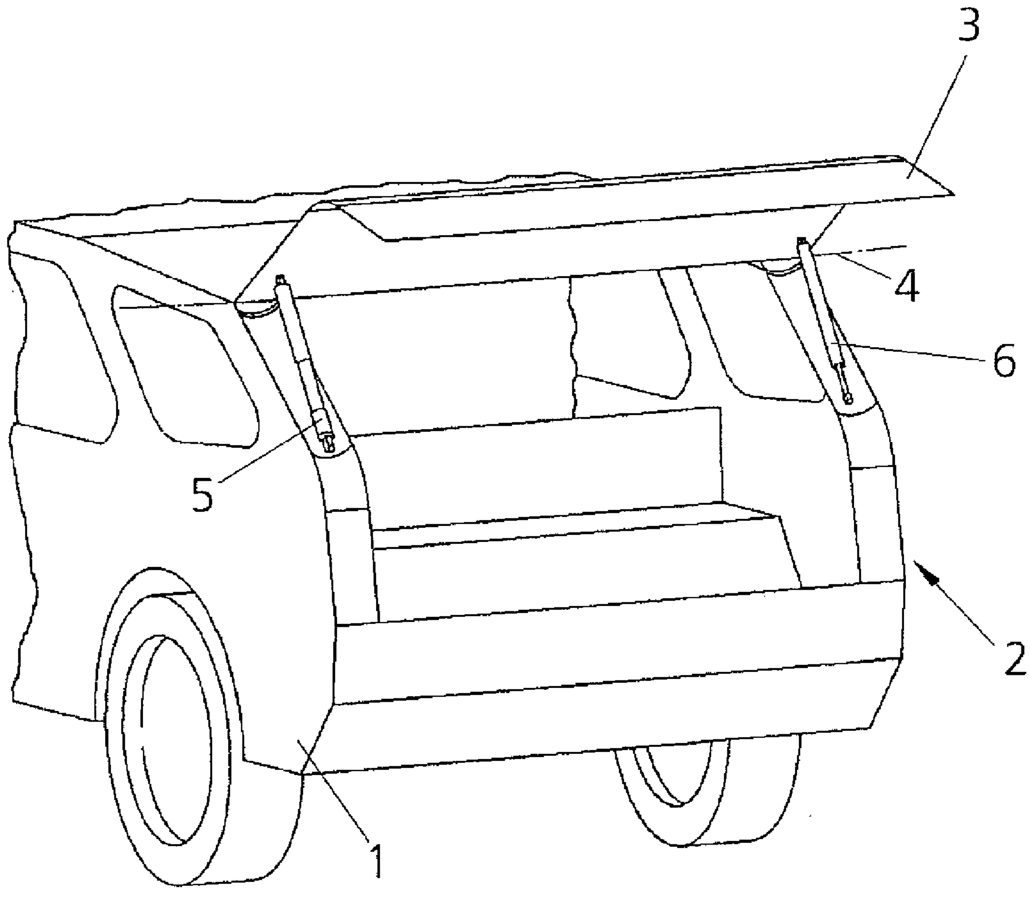
FIG. 1 is a schematic view of a motor vehicle with a rear hatch that is driven in a swivelable manner.

The schematic diagram in FIG. 1 shows a motor vehicle with a body as base part 1 and a movable structural component part 3, constructed as a rear hatch, which closes or opens an opening 2 of the base part 1.

It should be noted that the structural component part which is movable relative to the base part 1 can also be a front hood or engine hood, a vehicle door, or a corresponding application.

The movable structural component part 3 is mounted on a horizontal swiveling axis 4 extending transverse to the vehicle. A first driving device 5 is arranged at one side of the movable structural component part 3. A second driving device 6 is arranged at the opposite side of the hatch 3.

Figure 2:
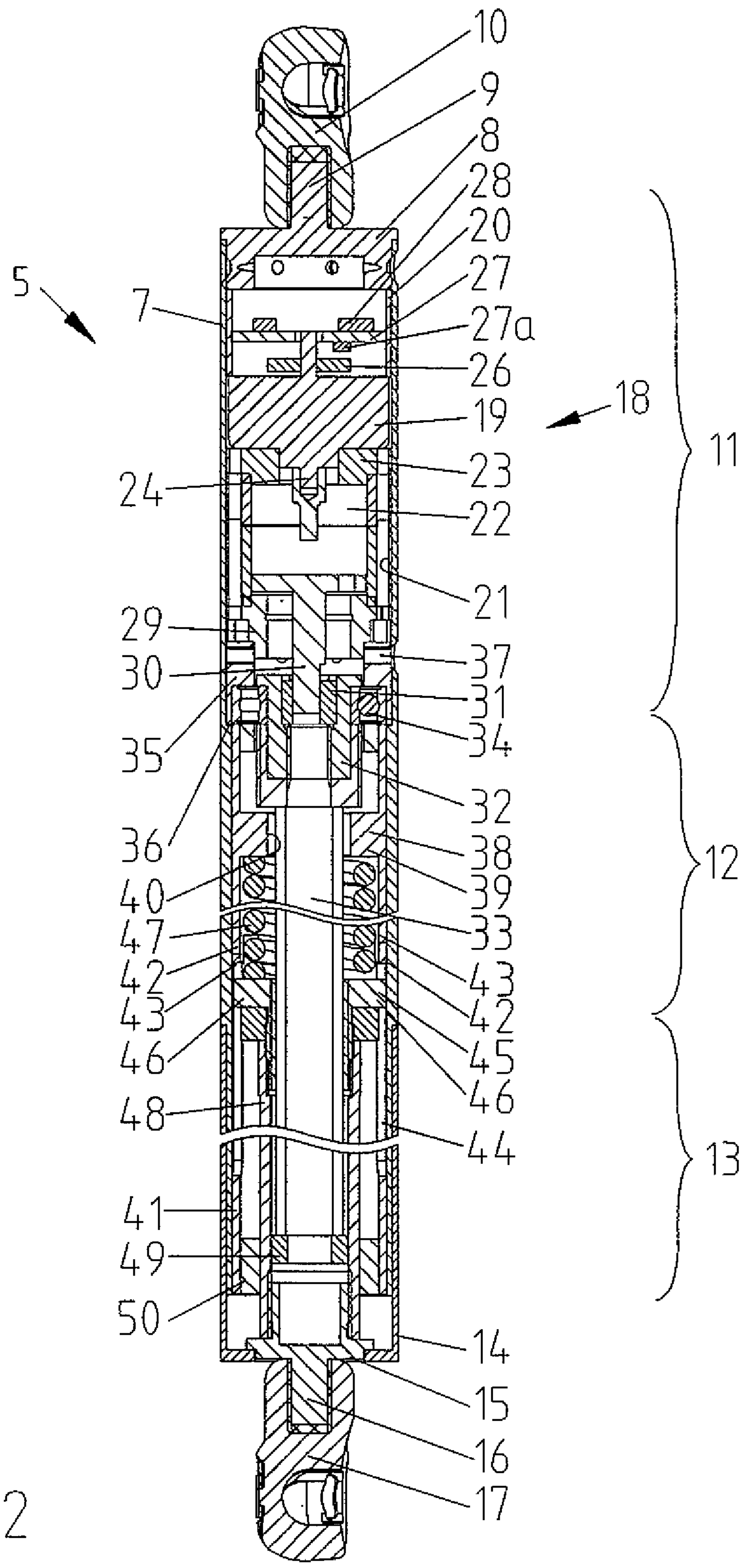
FIG. 2 is a cross section through a driving device.

By way of example, FIG. 2 shows an embodiment form of one of the two driving devices 5, 6 in the form of an electromechanical driving device which will be associated with the first driving device 5 in the following description for the sake of simplicity. The second driving device 6 can also be an electromechanical driving device or, as is shown in FIG. 1, a gas spring.

The first driving device 5 has a housing tube 7 that is closed at one end by a base piece 8. The base piece 8 has a threaded pin 9 on which a connection element 10 is screwed.

The housing tube 7 has a first portion 11, a second portion 12, and a third portion 13. The first portion 11 has a larger inner diameter than the second portion 12, while its outer diameter remains the same. In contrast, the third portion 13 has a smaller outer diameter than the second portion 12 but the same inner diameter.

A protective tube 14 whose outer diameter substantially corresponds to the outer diameter of the second portion 12 of the housing tube 7 is arranged over the third portion 13 of the housing tube 7. The protective tube 14 is closed by a base piece 15 at its end remote of the housing tube 7. The base piece 15 has a threaded pin 16 on which a connection element 17 is screwed. By the connection elements 10 and 17, the first driving device 5 can be connected in an articulated manner to a stationary structural component part of the body, or base part 1, of a motor vehicle and at a movable structural component part 3 of the motor vehicle which is formed as a hatch.

A rotary drive 18 is arranged in the interior of the housing tube 7 in the area of the first portion 11. The rotary drive 18 comprises an electric motor 19, a sensor device which is accommodated in a sensor housing 20, and a gear unit 22 which is accommodated in a gear unit housing 21. The electric motor 19 is supported by the sensor housing 20 at the end of the housing tube 7 that is closed by the base piece 8. The gear unit housing 21 is supported at the electric motor 19 by an adapter element 23. The gear unit 22 arranged in the gear unit housing 21 is driven by a motor driveshaft 24. Further, the motor driveshaft 24 projects into the sensor housing 20 on the side opposite the gear unit housing 22. The connection lines comprising the power supply lines and control lines, not shown, extend from the sensor housing 20 through the base piece 8 out of the housing tube 7. The electric motor 19 can be connected by these connection lines to an energy source, not shown, in particular an automobile battery or a control device 25 shown in FIGS. 3 to 6.

The motor driveshaft 24 projecting into the sensor housing 20 carries a permanent magnet 26 which is located axially opposite an electronics board 27 which is arranged in a stationary manner near the free end of the motor driveshaft 24 at the sensor housing 20 or, alternatively, at the housing tube 7. The electronics board 27 has at least one Hall element 27*a* of an arrangement for sensing speed and rotational direction on the side facing the permanent magnet 26. A safety circuit 28 is arranged on the side of the electronics board 27 remote of the permanent magnet 26.

The gear unit housing 21 is closed by a housing cover 29 at the side opposite the electric motor 19. A gear shaft 30 extends through the housing cover 29. The end of the gear shaft 30 is connected to a spindle drive. In addition, an adapter insert 31 at which a spindle adapter 32 is arranged is located at the end of the gear shaft 30. A threaded spindle 33 is connected to the gear shaft 30 with the adapter insert 31 and the spindle adapter 32.

The spindle adapter 32 is supported in a bearing 34. The bearing 34 in turn is arranged in a bearing sleeve 35 which is supported at the gear unit housing 21 or at the housing cover 29 on one side and, on the other side, contacts a step 36 formed by the different inner diameters of the portions 11 and 12. Accordingly, the rotary drive 18, together with the bearing 34 of the threaded spindle 33, is fixed in axial direction inside the first portion 11 of the housing tube 7. Parts of the rotary drive 18 can be connected to the housing tube 7 by screws 37 or dimples in such a way that they cannot rotate relative to the housing tube 7.

A spring sleeve 38 is supported at the bearing 34 or at the bearing sleeve 35, substantially in the second portion 12, so as to contact the inner wall of the housing tube 7. A wall 39 with a bore hole 40 is formed in the interior of the spring sleeve 38, and the threaded spindle 33 projects through this bore hole 40. The spring sleeve 38 is lengthened by a guide tube 41 from the second portion 12 of the housing tube 7 in direction of the third portion 13 to the end of the housing tube 7. The spring sleeve 38 has recesses 42 at its end near the guide tube 41. Projections 43 which are formed at the end of the guide tube 41 near the spring sleeve 38 engage in these recesses 42, so that the spring sleeve 38 and guide tube 41 are prevented from rotating relative to one another. Further, the guide tube 41 has at least one guide device 44 that extends in axial direction and which is formed as a slot. A projection 46 formed at a spindle nut 45 projects into this guide device 44.

A spring element 47, which partially surrounds the threaded spindle 33, extends from the side of the wall 39 remote of the bearing 34 in direction of the third portion 13 of the housing tube 7 and comes into contact with the spindle nut 45 running on the threaded spindle 33, in particular when the first driving device 5 is inserted, i.e., the hatch 3 is located in its position in which it is almost completely closed. The spring element 47 tends to force the spindle nut 45 away from the wall 39 when opening the hatch 3 from its completely closed position and accordingly reinforces the rotary drive 18 at least for the initial centimeters of the hatch opening movement.

A spindle tube 48 is guided in the guide tube 40 so as to be axially movable by the spindle nut 45, the spindle tube 48 being arranged with one end at the spindle nut 45 and with its other end at the base piece 15 of the protective tube 14. At the end near the base piece 15, the threaded spindle 33 has a guide ring 49 arranged in the spindle tube 48 so that the threaded spindle 33 is prevented from swinging radially.

Another guide ring 50 which likewise prevents a radial swinging of the telescopically extensible structural component parts and forms a stable protection against buckling or bending is arranged between the spindle tube 48 and the end of the housing tube 7 near the connection element 17.

Figure 3A:
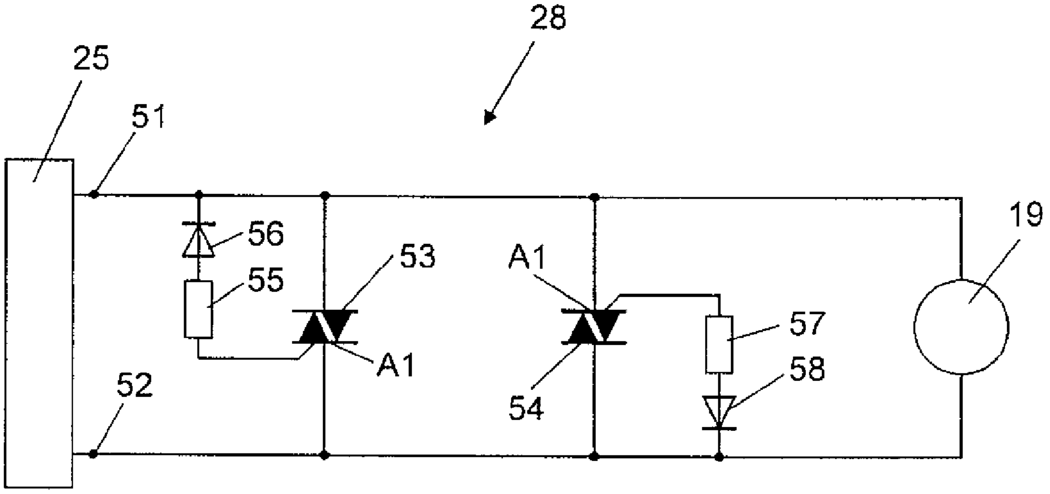
FIG. 3*a* is a safety circuit integrated in the driving device according to FIG. 1.

FIG. 3*a* is a circuit diagram of a first safety circuit 28. The electric motor 19 is connected to a first connection contact 51 of the control device 25 on one side and to a second connection contact 52 of the control device 25 on the other side. Two triacs 53, 54 are connected in parallel with the motor 19, the anodes of the two triacs are also connected to the connection contacts 51 and 52 of the control device 25. The gate of triac 53 is connected to the first connection contact 51 by a high-value resistor 55 of preferably between 600Ω and 10 kΩ, depending on the desired trigger current of the triac that is used, and by a diode 56. However, other suitable resistor/triac combinations are also conceivable. The cathode of diode 56 is connected to the first connection contact 51 and the anode is connected to the resistor 55. The gate of triac 54 is electrically connected to the second connection contact 52 of the control device 25 by another high-value resistor 57 and a diode 58. The cathode of diode 58 is electrically connected to the second connection contact 52 and the anode is electrically connected to the resistor 57.

During normal operation, i.e., when a user opens or closes the hatch of the vehicle by a switch and, therefore, by the electric motor 19, the operating voltage of the motor 19 is applied between the connection contacts 51, 52 of the control device 25. This operating voltage is preferably between 8 and 16 volts, but other voltages are also possible. In particular, a pulse-width-modulated signal can also be applied. In case of very strong extraneously applied forces on the hatch 3 which are caused, for example, by very fast manual closing or opening of the hatch 3, a voltage many times higher than the voltage in normal operation is generated in the motor 19. Depending on whether the hatch 3 is moved upward or downward very fast, a current flows through the anode A1 of the triac 53 or 54 and through the resistor/diode arrangement 55, 56 and 57, 58 associated with the triac, and the corresponding triac 53 or 54 switches on. This short-circuits the motor windings, and only the internal resistance of the motor 19 and minor contact resistances are still present. As a result, the motor 19 is sharply braked, and the energy of the extraneously applied forces is converted into heat. If the hatch 3 remains stationary, either because it has reached its end position or because the extraneously applied forces have relented, there is no longer a flow of current and the triggered triac 53 or 54 is switched off.

Figure 3B:
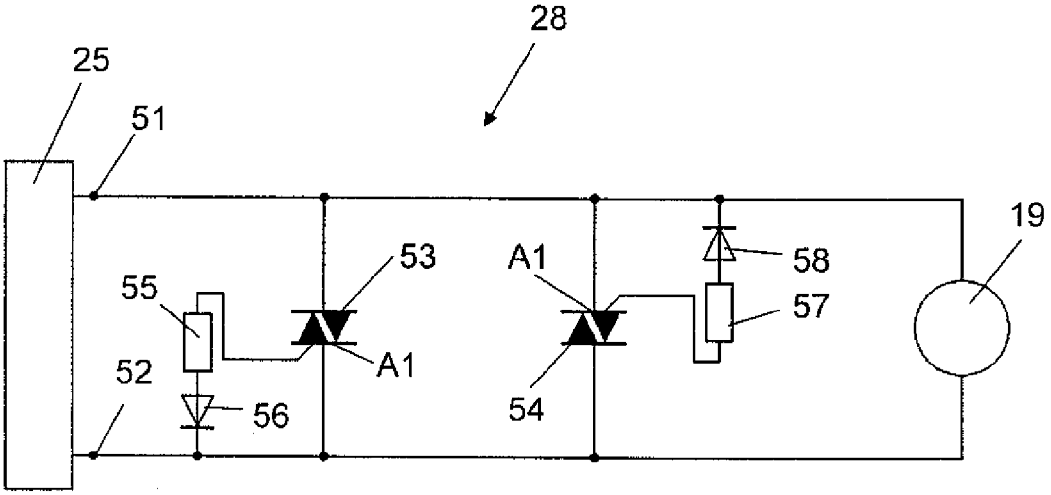
FIG. 3*b* is an alternative embodiment form of the safety circuit shown in FIG. 3*a;*

As is shown in FIG. 3*b*, in triac types which have a different internal construction and are triggered by the gate and the anode across from anode A1, the cathode of diode 56 is connected to the second connection contact 52, and the cathode of diode 57 is connected to the first connection contact 51.

Figure 4A:
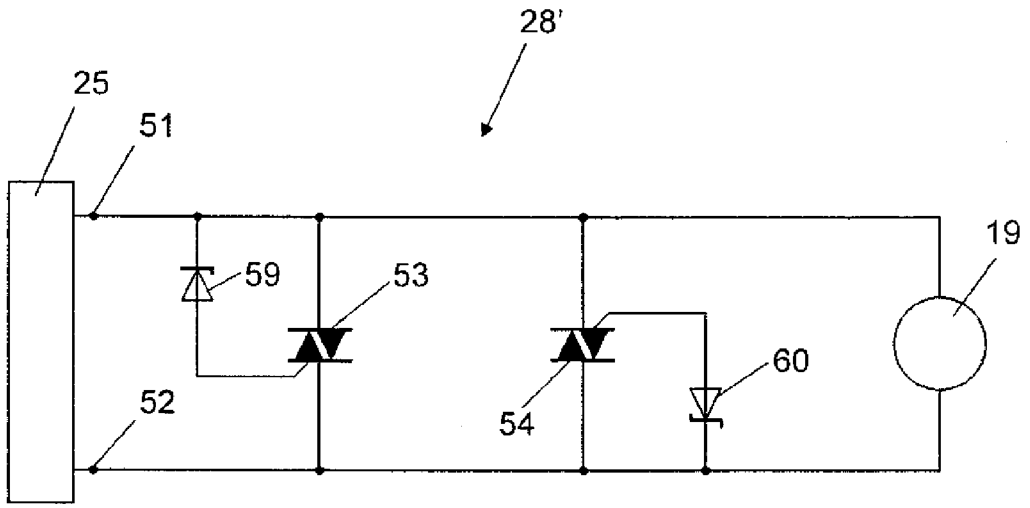
FIG. 4*a* is a second embodiment form of the safety circuit integrated in the driving device according to FIG. 1.

The safety circuit 28' shown in FIG. 4*a* substantially corresponds to the circuit in FIG. 3*a*, but the gate of the triac 53 is connected to the first connection contact 51 of the control device 25 by a Zener diode 59, and the gate of triac 54 is connected to the second connection contact 52 by a Zener diode 60. In this case, the cathode of the Zener diode 59 is connected to the first connection contact 51 and the cathode of Zener diode 60 is connected to the second connection contact 52.

In normal operation, the circuit behaves in the manner described with reference to FIGS. 3 and 3*b*. In case of very strong extraneously applied forces on the hatch, a voltage many times higher than the voltage in normal operation is generated in the motor 19. Depending on whether the hatch 3 is moved upward or downward very fast, a current flows through the anode A1 of the triac 53 or 54 by which the Zener diode 59 or 60 associated with the triac and the corresponding triac 53 or 54 switches on.

Figure 4B:
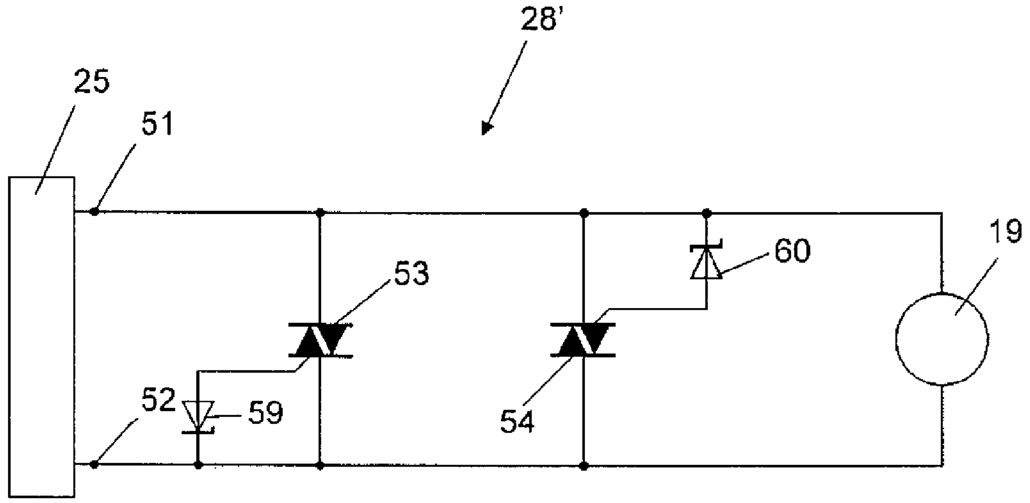
FIG. 4*b* is an alternative embodiment form of the safety circuit shown in FIG. 4*a;*

As is shown in FIG. 4*b*, in triac types which are triggered by the gate and the anode across from anode A1, the cathode of the Zener diode 59 is connected to the second connection contact 52, and the cathode of Zener diode 60 is connected to the first connection contact 51.

Figure 5A:
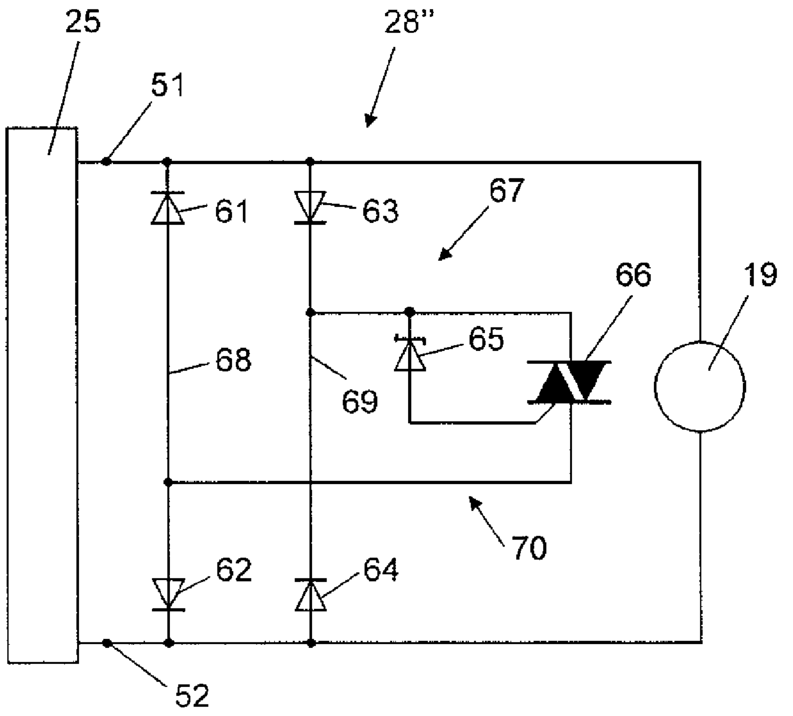
FIG. 5*a* is a third embodiment form of the safety circuit integrated in the driving device according to FIG. 1.

In the safety circuit 28" shown in FIG. 5*a*, a bridge circuit 67 comprising four diodes 61, 62, 63, 64, a Zener diode 65, and a triac 66 is connected between the connection contacts 51 and 52 of the control device 25 and, therefore, in parallel with the electric motor 19. The two diodes 61 and 62 are arranged in a first arm 68 of the bridge circuit 67, and the cathode of diode 61 is connected to the first connection contact 51 of the control device 25, and the cathode of diode 62 is connected to the second connection contact 52 of the control device 25. Accordingly, the anodes of diodes 61 and 62 are connected to one another in an electrically conducting manner. Diodes 63 and 64 are arranged in a second arm 69 of the bridge circuit 67. The anode of diode 63 is connected to the first connection contact 51 of the control device 25, and the anode of diode 64 is connected to the second connection contact 52 of the control device 25. In this case, the cathodes of diodes 63 and 64 are connected to one another in an electrically conducting manner. An anode of triac 66 is connected to the anodes of diodes 61 and 62, the other anodes are connected to the cathodes of diodes 63 and 64. In so doing, the triac 66, together with the Zener diode 65 connected to the gate of triac 66 and the cathodes of diodes 63 and 64, forms a bridge branch 70. The anode of Zener diode 65 is connected to the gate of triac 66, and the cathode is connected to the cathodes of diodes 63 and 64.

Normal operation corresponds to the normal operation of the safety circuit described with reference to FIGS. 3*a* to 4*a*. When the very high extraneously applied forces which were already mentioned above are applied to the hatch 3, the triac 66 is triggered when the Zener voltage to the Zener diode 65 is exceeded. The circuit is then closed either through diode 63, triac 66 and diode 62 or through diode 64, triac 66 and diode 61 depending on the direction in which the electric motor 19 is moved, i.e., depending on whether the extraneously applied force acts on the hatch 3 in the closing direction or in the opening direction.

Figure 5B:
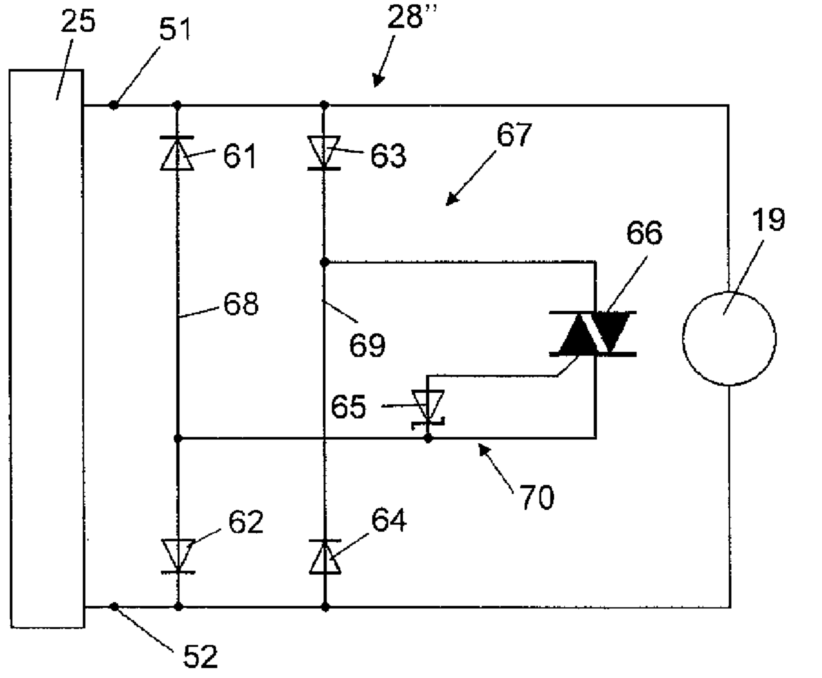
FIG. 5*b* is an alternative embodiment form of the safety circuit shown in FIG. 5*a;*

When the triac is triggered by the anode across from anode A1 and by the gate, as is shown in FIG. 5*b*, the anode of the Zener diode 65 is connected to the gate of triac 66, and the cathode is connected to the anodes of diodes 61 and 62.

Figure 6A:
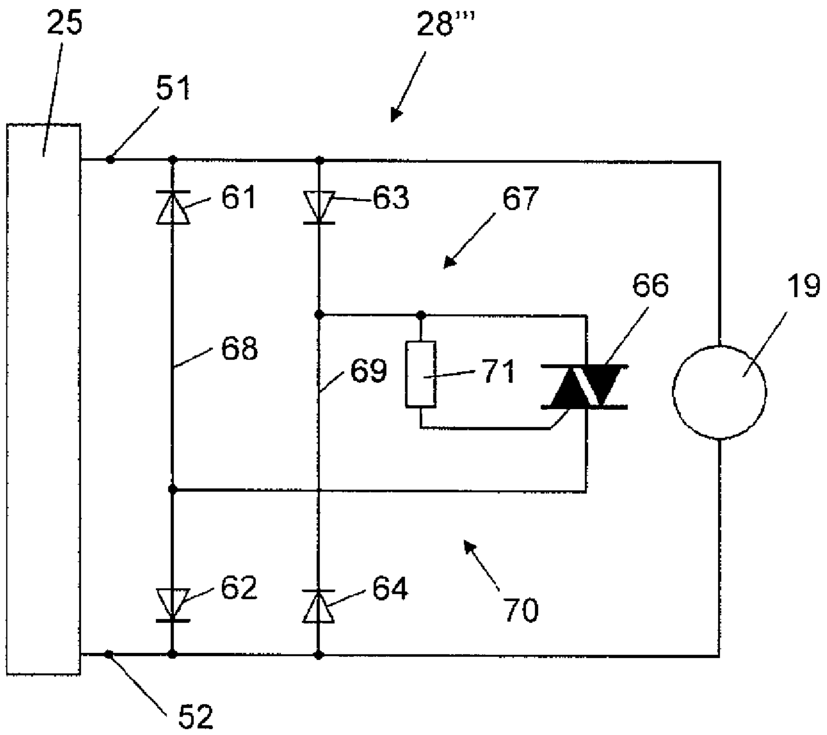
FIG. 6*a* is a fourth embodiment form of the safety circuit integrated in the driving device according to FIG. 1.

The safety circuit 21''' shown in FIG. 6*a* substantially corresponds to the circuit from FIG. 5*a*, but the gate of the triac 66 is connected to the cathodes of diodes 63 and 64 by a high-value resistor 71. When the current across the resistor 71 is sufficiently high, the triac 66 is triggered and the circuit is closed in the manner described with reference to FIG. 5*a*.

Figure 6B:
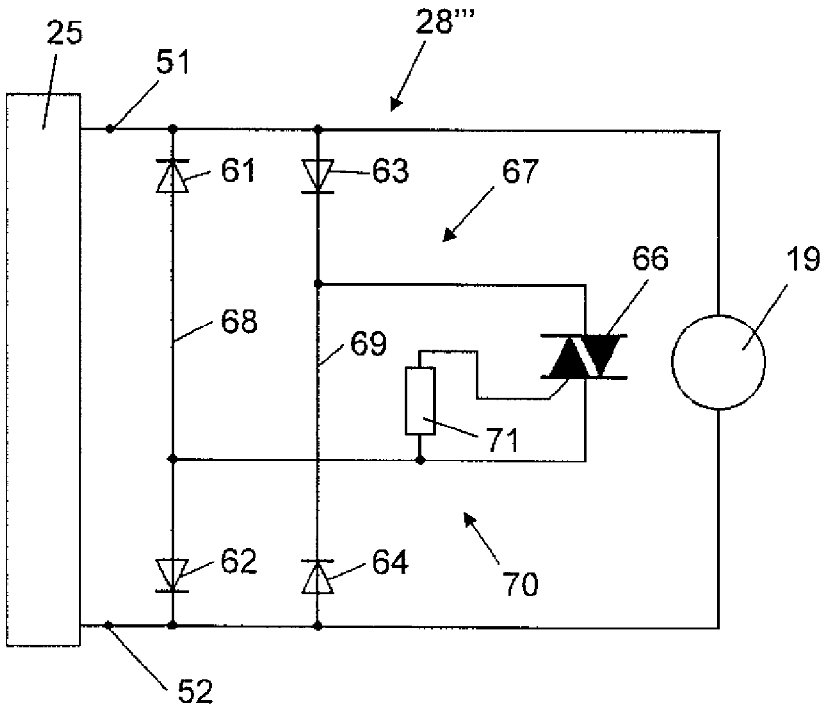
FIG. 6*b* is an alternative embodiment of the safety circuit shown in FIG. 6*a*.

As is shown in FIG. 6*b*, the resistor 71 is connected to the anodes of diodes 61 and 62 when a triac is triggered by the gate and the anode across from anode A1. Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A driving device for a hatch in a vehicle, comprising:

a housing tube configured to be connected to one of a stationary base part and a movable structural component part of the vehicle;

a protective tube configured to be connected to the other of the stationary base part and the movable structural component part of the vehicle;

a spindle drive comprising a threaded spindle and a spindle nut arranged on the threaded spindle configured to move the housing tube and the protective tube axially relative to one another;

a rotary drive that drives the spindle drive in rotation comprising at least one electric motor; and a safety circuit configured to cause a braking effect on the rotary drive when the rotary drive is deactivated by short circuiting a winding of the rotary drive and when extraneous external forces are introduced into the driving device, wherein the safety circuit comprises:

an electronics board arranged in the housing tube; and an arrangement for sensing speed and rotational direction of the rotary drive, wherein the safety circuit works independently from the arrangement for sensing speed and rotational direction.

2. The driving device according to claim 1, wherein the safety circuit is arranged in a cable of the driving device.

3. The driving device according to claim 1, wherein the safety circuit is arranged in a plug of the cable of the driving device.

4. The driving device according to claim 1, wherein the safety circuit comprises at least one triac configured to short-circuit the winding of the electric motor.

5. Driving device according to claim 4, wherein the safety circuit is a bridge circuit comprising four diodes, and at least one of a Zener diode and a resistor, are connected in parallel with the electric motor.

6. The driving device according to claim 5, wherein a first and a second diode are arranged in a first arm of the bridge circuit, a cathode of the first diode is connected to the first connection contact of the control device, and a cathode of the second diode is connected to the second connection contact of the control device, and respective anodes of the first and second diodes are connected to one another in an electrically conducting manner, and a third and a forth diode are arranged in a second arm of the bridge circuit, an anode of the third diode is connected to the first connection contact of the control device, and an anode of the forth diode is connected to the second connection contact of the control device, and respective cathodes of the third and fourth diodes are connected to one another in an electrically conducting manner.

7. The driving device according to claim 6, wherein one anode of the triac is connected to the respective anodes of the first and second diodes in the first arm of the bridge circuit, and an other anode of the triac is connected to the respective cathodes of the third and fourth diodes in the second arm of the bridge circuit.

8. The driving device according to claim 7, wherein the triac, together with the Zener diode connected to a gate of the triac, forms a bridge branch, the anode of the Zener diode is connected to the gate of the triac, and the cathode of the Zener diode is connected to one of the cathodes of the respective diodes in the second arm and the anodes of the respective diodes in the first arm.

9. The driving device according to one of claims 7, wherein the triac, together with the resistor connected to a gate of the triac, forms a bridge branch, a first contact of the resistor is connected to the gate of the triac, and the other contact is connected to one of the cathodes of the respective diodes in the second arm and the anodes of respective the diodes in the first arm.

10. The driving device according to claim 5, wherein one anode of the triac is connected to respective anodes of a first and a second diode in a first arm of the bridge circuit, and an other anode of the triac is connected to respective cathodes of a third and a forth diode in a second arm of the bridge circuit.

11. The driving device according to claim 1, further comprising:

a control device, a first connection of the electric motor is connected to a first connection contact of the control device and a second connection of the electric motor is connected to a second connection contact of the control device;

a first triac connected in parallel with the electric motor, wherein an anode of the first triac is coupled to the first connection contact of the control device; and a second triac connected in parallel with the electric motor, wherein an anode of the second triac is coupled to the second connection contact of the control device.

12. The driving device according to claim 11, wherein a gate of the first triac is coupled to one of the connection contacts of the control device by a series connected first resistor and a first diode, the cathode of the first diode is connected to the one of the connection contacts and the anode of the first diode is connected to the first resistor, and a gate of the second triac is electrically connected to the other connection contact of the control device by a series connected second resistor and a second diode, the cathode of the second diode is electrically connected to the other connection contact, and the anode of the second diode is electrically connected to the second resistor.

13. The driving device according to claim 11, wherein a gate of the first triac is connected to one of the connection contacts of the control device via a first Zener diode, and a gate of the second triac is connected to the other connection contact via a second Zener diode.

14. The driving device according to claim 13, wherein cathodes of the respective Zener diodes are connected to respective connection contacts of the control device.

* * * * *